(12) United States Patent
Fournier et al.

(10) Patent No.: US 7,851,702 B2
(45) Date of Patent: Dec. 14, 2010

(54) SERVICE CABINET FOR USE WITH A UTILITY POLE

(75) Inventors: Paul W. Fournier, 1302 Robincrest St., Mascouche, Quebec (CA) J7L 3S4; Guy Geoffroy, Asbestos (CA); Jean-Jacques Legault, Asbestos (CA)

(73) Assignee: Paul W. Fournier, Macouche, Quebec (CA)

( * ) Notice: Subject to any disclaimer, the term of this patent is extended or adjusted under 35 U.S.C. 154(b) by 0 days.

(21) Appl. No.: 12/502,470

(22) Filed: Jul. 14, 2009

(65) Prior Publication Data

US 2009/0273261 A1 Nov. 5, 2009

Related U.S. Application Data

(63) Continuation of application No. PCT/CA2008/000081, filed on Jan. 15, 2008.

(60) Provisional application No. 60/884,906, filed on Jan. 15, 2007.

(51) Int. Cl.
*H02G 7/20* (2006.01)
*H02B 1/30* (2006.01)

(52) U.S. Cl. ............... 174/45 R; 174/50; 174/559; 174/38; 312/237; 312/223.1

(58) Field of Classification Search ............ 174/50, 174/45 R, 493, 504, 505, 535, 559, 60, 68.1, 174/68.3, 72 A, 58, 38; 220/3.2, 3.3, 3.9, 220/4.02; 312/237, 223.1; 248/218.4, 219.1; 361/600, 601, 724, 752; 52/292, 296, 835
See application file for complete search history.

(56) References Cited

U.S. PATENT DOCUMENTS

| 1,696,934 | A | | 1/1929 | Allen | |
|---|---|---|---|---|---|
| 3,373,276 | A | * | 3/1968 | Klein | 174/45 R |
| 3,485,932 | A | * | 12/1969 | Van Schaack | 174/38 |
| 3,800,063 | A | * | 3/1974 | Di Maggio et al. | 174/38 |
| 5,335,160 | A | * | 8/1994 | Savoca | 174/45 R |
| 6,486,399 | B1 | * | 11/2002 | Armstrong et al. | 174/58 |
| 6,872,883 | B2 | * | 3/2005 | Ginsburg | 174/45 R |
| 6,969,034 | B2 | | 11/2005 | Ware et al. | |
| 7,059,096 | B2 | * | 6/2006 | Kuebler et al. | 174/45 R |

FOREIGN PATENT DOCUMENTS

| CA | 2449194 | 5/2005 |
|---|---|---|
| FR | 2 782 371 | 2/2000 |

\* cited by examiner

*Primary Examiner*—Angel R Estrada
(74) *Attorney, Agent, or Firm*—Ogilvy Renault

(57) ABSTRACT

The service cabinet is for use around a utility pole for receiving electrical or communication equipment. The service cabinet comprises a frame having at least two complementary parts connectable together and to the bottom section of the utility pole. The frame generally defines a vertically-extending internal passage for enclosing the bottom section of the utility pole. A side wall is connected to the frame, providing at least one internal chamber. The service cabinet can be used around an existing utility pole as a retrofit cabinet, or be used around a newly installed utility pole. It does not create a new obstacle when used in an urban area and can have a low manufacturing cost since it uses the utility pole as a substrate.

17 Claims, 7 Drawing Sheets

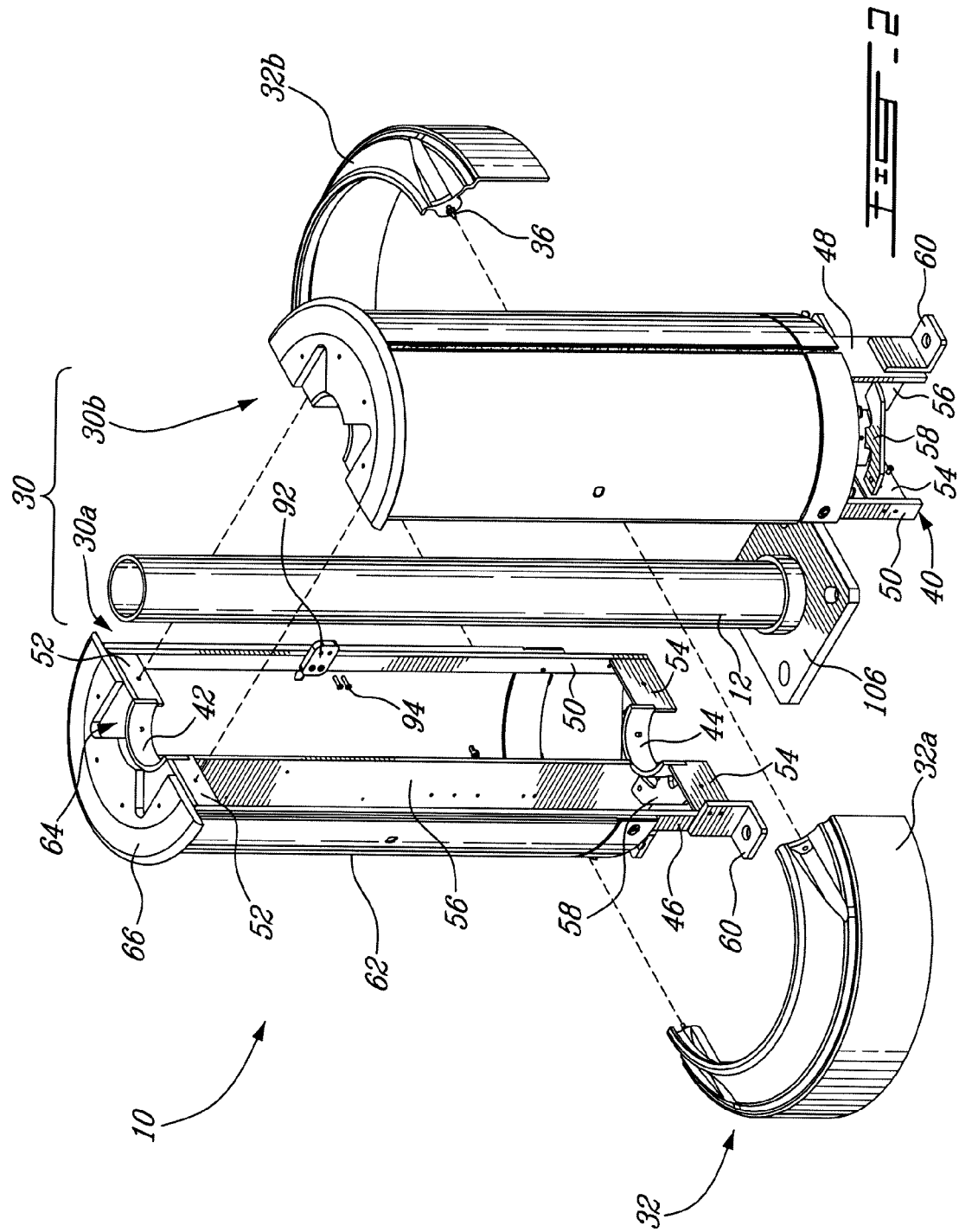

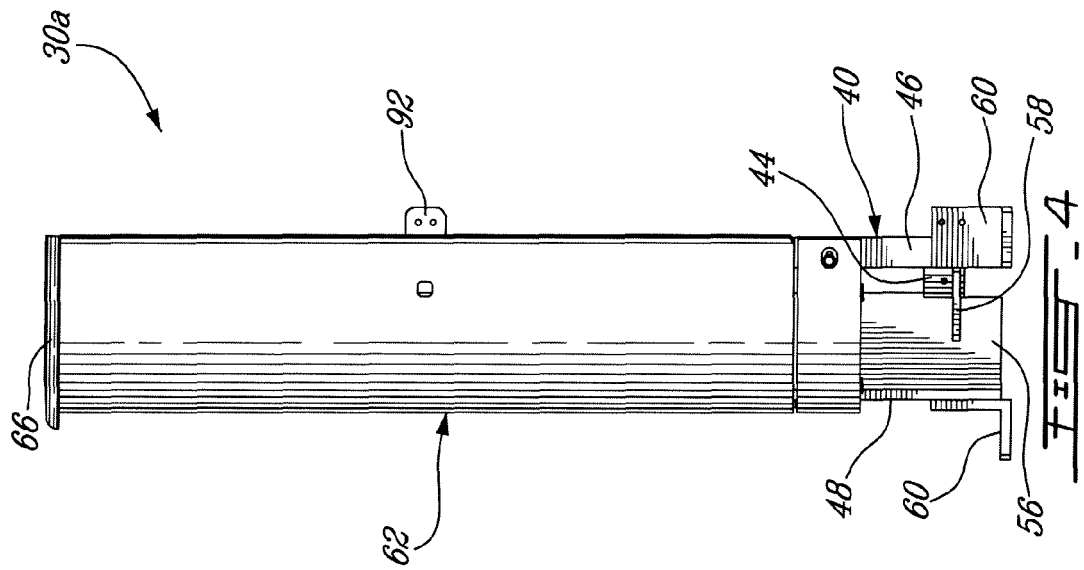
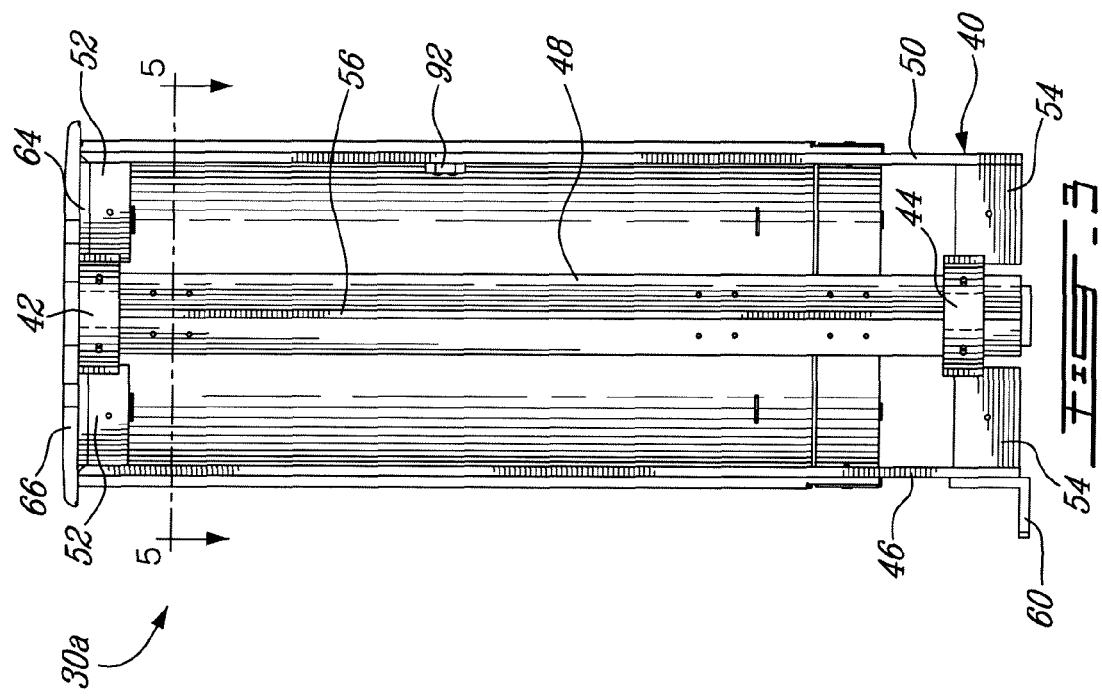

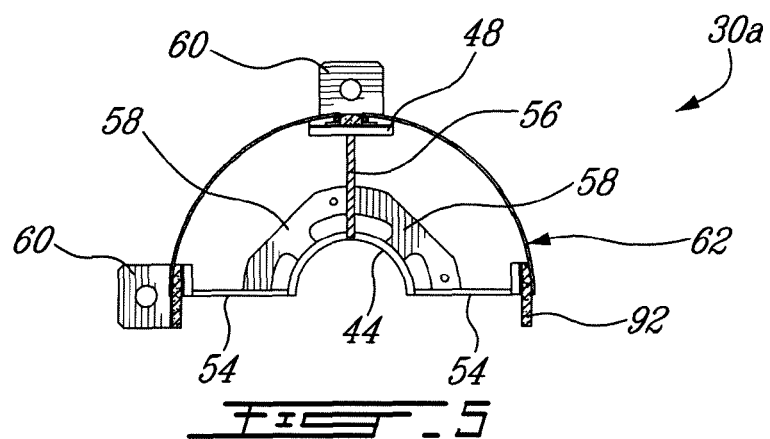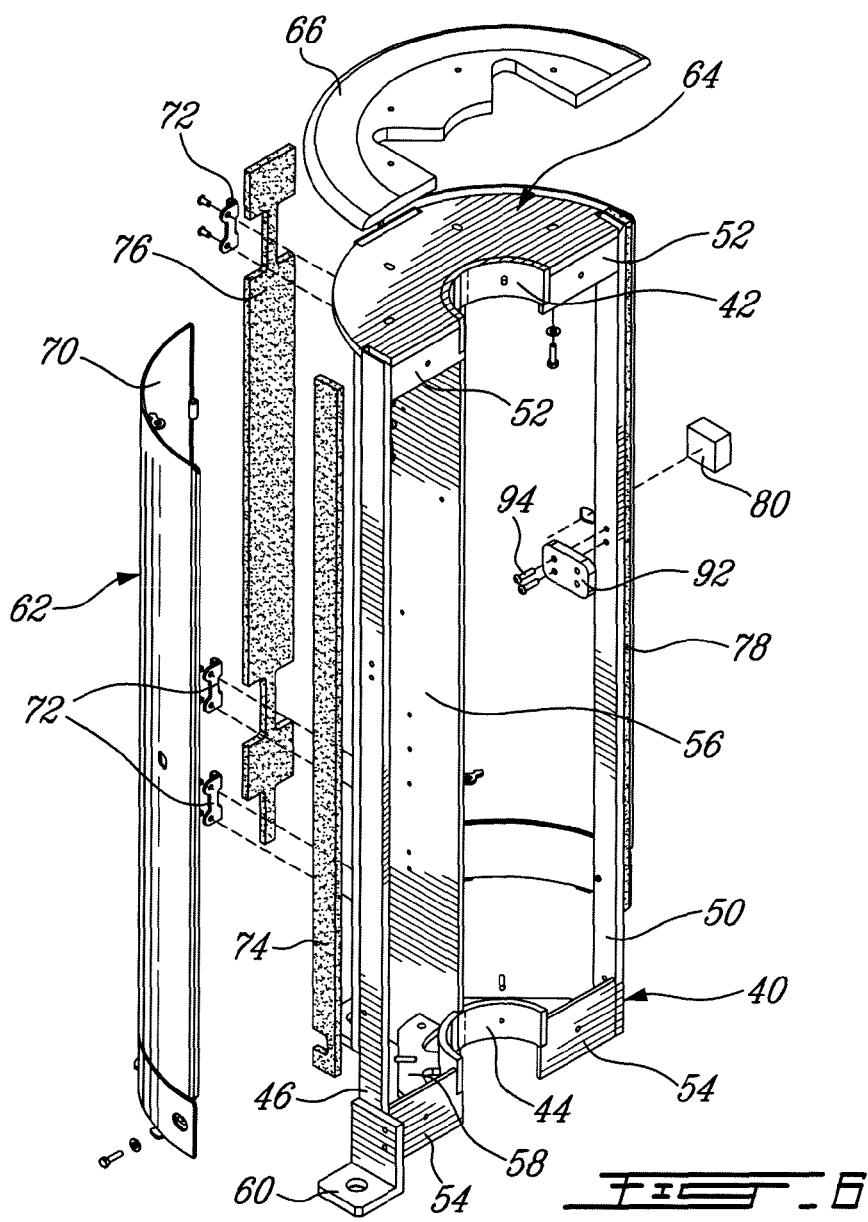

SERVICE CABINET FOR USE WITH A UTILITY POLE

RELATED APPLICATION(S)

This application is a continuation of PCT Parent Application No. PCT/CA2008/000081 filed on Jan. 15, 2008, which claims benefit of U.S. Patent Application No. 60/884,906 filed on Jan. 15, 2007, which are herein incorporated by reference.

BACKGROUND OF THE ART

The continuous expansion of underground power transmission and telecommunication networks increases the need of having more access points for wire connections and also locations for installing electronic equipments or other equipments associated with these networks. However, providing these new access points can be challenging in terms of the availability of space, especially in dense urban regions where new access points in the form of aboveground cabinets may not always be acceptable because they create new obstacles or require permissions from the owners of the property where these cabinets are installed. The manufacturing costs for these cabinets and the costs associated with their installation may also represent a challenge, especially when a large number of these cabinets are needed.

To alleviate at least some of the above-mentioned needs, the present concept provides a service cabinet designed to be easily installed around a utility pole, for instance a lamp post, that is either existing or is newly installed along with the service cabinet.

SUMMARY

In one aspect, there is provided a service cabinet for use around a bottom section of a utility pole, the service cabinet comprising: an interior frame having at least two complementary parts removably connectable together and to the bottom section of the utility pole, the frame generally defining a vertically-extending internal passage for enclosing the bottom section of the utility pole, and at least two internal chambers with an open bottom; an exterior side wall connected to the interior frame, the exterior side wall including at least one access door for each of the at least two internal chambers; and a top wall connected to the interior frame.

In another aspect, there is provided a retrofit service cabinet for an existing utility pole extending upwardly from the ground, the service cabinet having at least two body sections to be removably coupled together for providing at least two internal chambers, the service cabinet comprising: an interior frame comprising an inner frame portion and an outer frame portion; an external shell connected to the outer frame portion, the external shell having at least one access door for each of the internal chambers; and means for removably connecting the interior frame around the utility pole.

DESCRIPTION OF THE DRAWINGS

Reference will now be made to the accompanying figures, in which:

FIG. 2 is a partially exploded isometric view of the main body and the decorative bumper of the service cabinet shown in FIG. 1, both being shown with the bottom of the utility pole;

FIG. 3 is an elevational view showing the interior of the main body of the service cabinet in FIG. 1;

FIG. 4 is a side elevational view of one half of the main body of the service cabinet shown in FIG. 1;

FIG. 5 is a cross sectional view taken along line 5-5 in FIG. 3;

FIG. 6 is a partially exploded isometric view of one half of the main body of the service cabinet shown in FIG. 1;

DETAILED DESCRIPTION OF THE PREFERRED EMBODIMENTS

An example of a service cabinet 10 is shown in FIGS. 1 to 8 and is described hereafter. Some of these figures also show an example of a utility pole 12, in this case a lamp post. It should be noted that the present concept is not limited to lamp posts. The utility pole referred to in the text can also be any other upstanding street furniture. For instance, utility poles can be used for holding electric wires, traffic lights or signs, etc.

Figure 1:
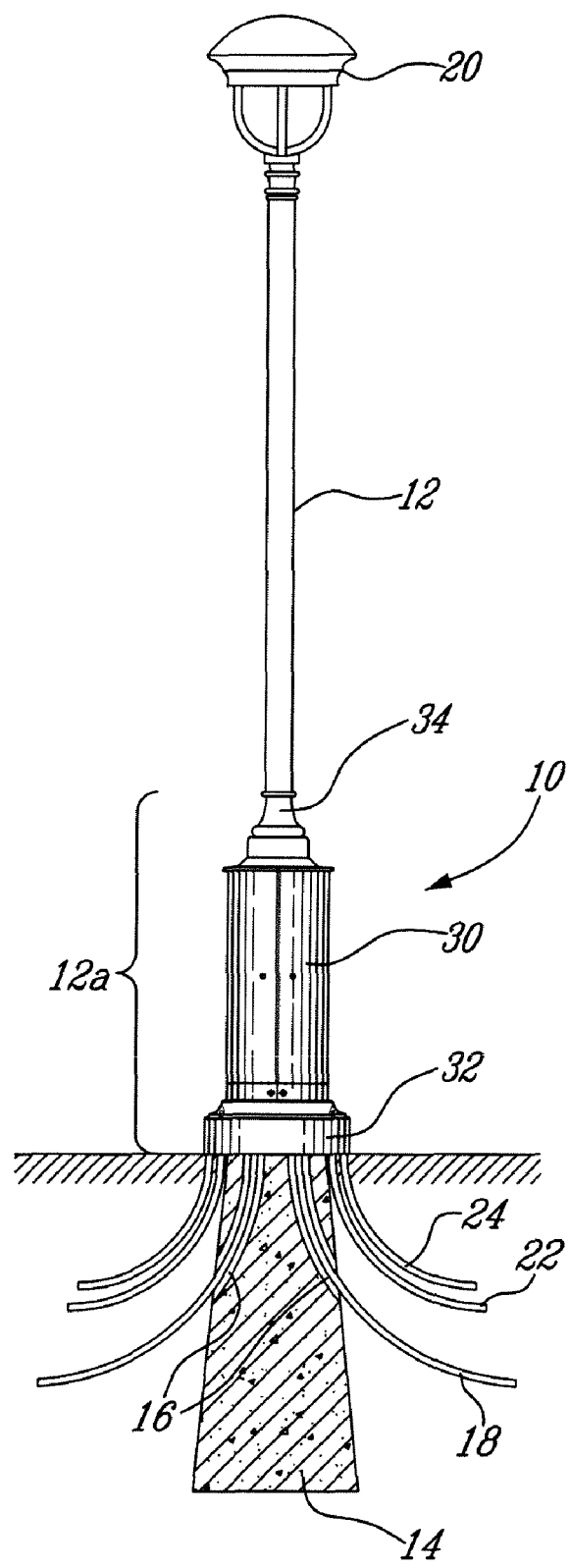
FIG. 1 is a side elevational view of an example of a utility pole mounted on concrete base and provided with an example of a service cabinet of the present concept.

While utility poles are often mounted on a concrete base, such as the concrete base 14 shown in FIG. 1, they can also be mounted over a metallic base buried or partially buried in the ground, or be connected to other objects, including a concrete slab or even a metal plate held in place by an adjacent large concrete block. Still, some utility poles may be simply inserted into the ground, and are thus not provided with a base.

In FIG. 1, the concrete base 14 comprises wire conduits 16 embedded therein for allowing ground-buried wires 18 to be connected to above ground equipment, such as a lighting fixture 20 mounted at the top, from the interior of the utility pole 12. The number and the diameter of the wire conduits 16 in the concrete base 14 are usually limited since they may otherwise create a structural weakening of the base 14. As a result, the existing conduit or conduits 16 leading into the utility pole 12 have a limited capacity for receiving wires. To add new electrical or communication wires, one may want to include one or several auxiliary ground wires 22, 24 next to the base 14, as shown. The auxiliary ground wires 22, 24 can be provided in protective conduits or not. Using auxiliary ground wires 22, 24 on the side of the concrete base 14 is an alternative over the replacement of the base 14, for instance for a larger one having larger wire conduits and/or a greater number of wire conduits. The auxiliary ground wires 22, 24 exit the ground at a position that is as close as possible to the base 14. The service cabinet 10 is also larger than the base 14 on all sides.

The service cabinet 10 is designed to be used around a bottom section 12a of the utility pole 12. The expression "bottom section" refers of course to the above-ground bottom section in the case of utility posts having a bottom end inserted into the ground. The service cabinet 10 is designed so as to fit as optimally as possible around the bottom section 12a and is attached to it. Thus, as can be appreciated, the service cabinet 10 in the present concept does not support the weight of the utility pole 12. It is instead using the utility pole 12 as a substrate to which it is connected. The utility pole 12 also provides strength and stiffness to the service cabinet 10. Therefore, the structure of the service cabinet 10 can be simplified so as to have a lower manufacturing cost.

The illustrated service cabinet 10 comprises a generally-cylindrical main body 30 surrounding the utility pole 12, and also a generally annular two-part bottom decorative bumper 32 having a width larger than that of the main body 30. The illustrated utility pole 12 further includes a decorative ring 34 located over the main body 30 of the service cabinet 10. The ring 34 can be a ring that was present at the bottom of the utility pole 12 before the service cabinet 10 is installed. The ring 34 can then be slid upwards and set over the main body 30 once the service cabinet 10 is assembled.

FIG. 2 shows that the main body 30 is divided in complementary parts, in this case two halves 30a, 30b. The halves 30a, 30b of the illustrated example are identical, which simplifies manufacturing and handling. The half 30a is individually shown in FIGS. 3 to 6. FIG. 3 is an elevational view showing the interior thereof. FIG. 4 is a side elevational view thereof. FIG. 5 is a cross sectional view taken along line 5-5 in FIG. 3. FIG. 6 is a partially exploded isometric view thereof.

FIG. 2 also shows the two parts 32a, 32b of the bumper 32. As can be seen, the bumper 32 of the illustrated example covers an open bottom section of the main body 30. The bottom section of the main body 30 is designed to receive the upper end of the auxiliary ground wires 22, 24 (FIG. 1). The two parts 32a, 32b of the bumper 32 are simply connected together around the open bottom section of the main body 30 using screws or bolts 36, as shown.

The main body 30 comprises a frame, generally referred to with reference numeral 40, which includes an inner frame portion and an outer frame portion. The various parts of the frame 40 are distributed in the two halves 30a, 30b of the main body 30. The inner frame portion of the illustrated example includes two vertically spaced-apart annular members 42, 44, while the outer frame portion includes a plurality of vertically-extending and spaced-apart frame members 46, 48, 50. The inner frame portion and the outer frame portion are interconnected by a plurality of vertically-disposed flanges 52, 54, 56. Two of these flanges, namely the flanges 56 (one in each half 30a, 30b), extend from the top to the bottom of the main body 30 and are also radially disposed. The other flanges 52, 54 are disposed in pairs on each side of the corresponding annular members 42, 44. The junction between each bottom annular member 44 and its corresponding flanges 54 is reinforced by horizontally-disposed brackets 58, as shown. The various elements of each half 30a, 30b of the main body 30 can be welded or otherwise connected to each other.

The bottom end of the vertical outer frame members 46, 48, 50 have bottom-extending legs and two are provided with L-shaped brackets 60 since the illustrated service cabinet 10 is also designed to be mounted over a metallic base, as described later in the text. Each half 30a, 30b has two orthogonally-disposed L-shaped brackets 60. The bracket 60 on each member 46 is designed to be attached to the adjacent member 50 of the other half when the two halves 30a, 30b are connected together.

A side wall 62 and a horizontal top wall 64 are connected to the frame 40 of the service cabinet 10. The side wall 62 and the top wall 64 are divided in two, each portion corresponding to a half 30a, 30b of the main body 30. The top wall 64 has a central opening, which is part of the vertically-extending passage for the utility pole 12. FIG. 2 also shows a two-part decorative upper plate 66 that is positioned immediately above the top wall 64. The decorative upper plate 66 is provided for enhancing the visual aspect of the service cabinet 10 with a larger rim under the decorative ring 34 (FIG. 1). The exact shape of the plate 66 can be different to what is shown.

In the illustrated example, the side wall 62 form a shell surrounding the frame 40 that has a substantially circular cross section when the two halves 30a, 30b of the main body 30 are connected together. The height of the side wall 62 is shorter than that of the frame 40 and the side wall 62 is attached to the upper region of the frame 40, as shown. The side wall 62 includes four access doors 70, one being shown individually in FIG. 6. Each access door 70 includes hinges 72 connected to the outer frame portion, more particularly to the vertically outer member 48. The hinges 72 can also be replaced by other equivalent elements, such as a flexible member. The access doors 70 can also be attached by screws only. Each half 30a, 30b of the main body 30 has two opposite access doors 70. The access doors 70 also constitute the entire side wall 62 of the illustrated example. The edges of the access doors 70 are cooperating with seals 74, 76, 78, for instance seals made of neoprene, which they engage when the access doors 70 are in a closed position. Two of the seals 76, 78 are narrower than the other seal 76. Each access door 70 can be provided with a lock 80 connected or connectable to the flame 40, for preventing unauthorized persons from accessing the space inside the service cabinet 10. One lock 80 is schematically depicted in FIG. 6. A single lock can also be used for two adjacent doors 70 or each door 70 can have its own lock 80. The access doors 70 are reinforced at the bottom.

Figure 7:
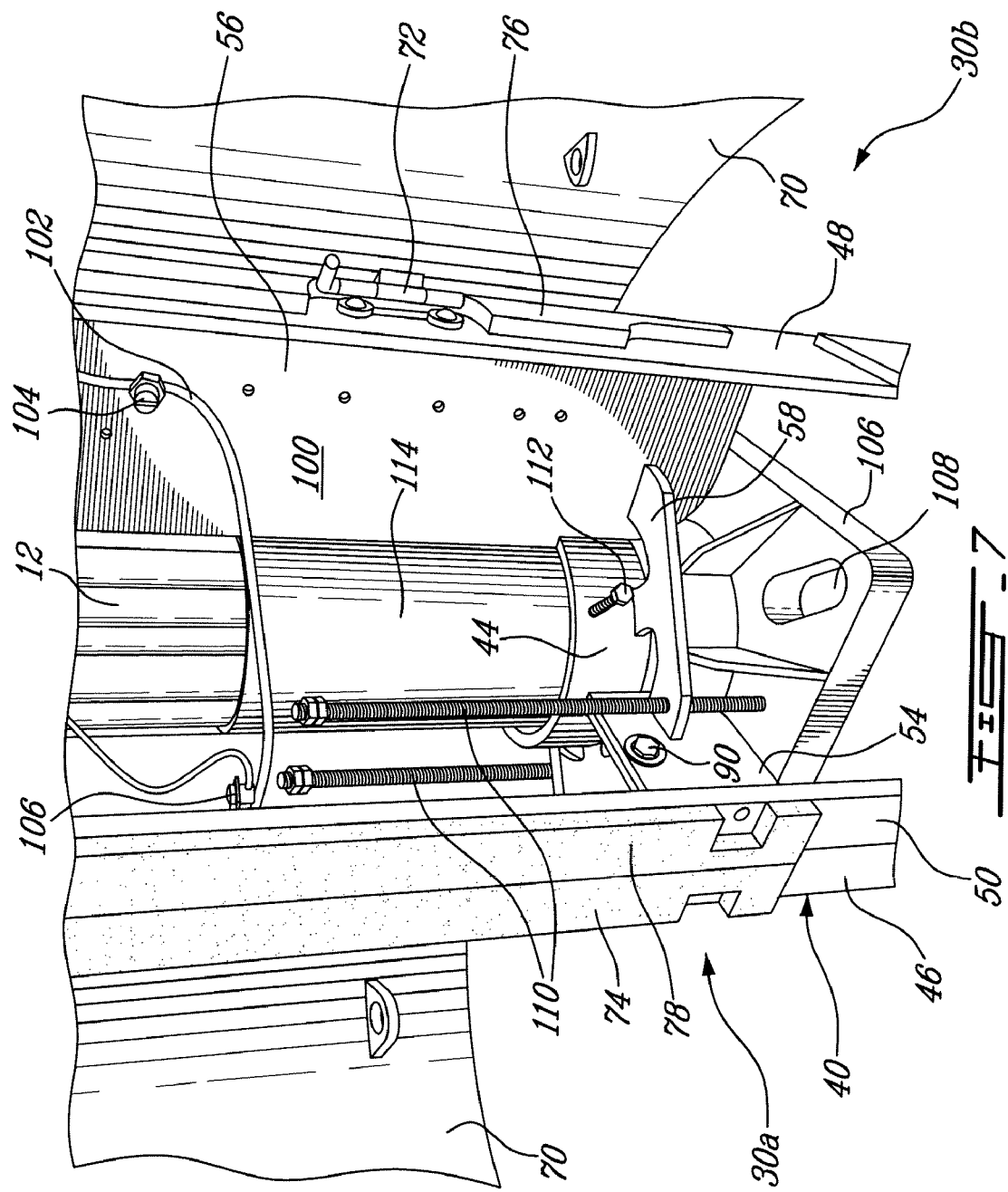
FIG. 7 is an enlarged isometric view showing the bottom of one of the chambers inside the service cabinet shown in FIG. 1.

As can be seen in FIG. 7, the main body 30 of the service cabinet 10 is configured and sized so that its two halves 30a, 30b fit snugly around the utility pole 12. Bolts 90 are used at the top and at the bottom for securing the flanges 52, 54 together when flanges 52, 54 of both halves 30a, 30b are adjacently-disposed. A bridge member 92 can also be provided near the middle of each half 30a, 30b of the main body 30. The bridge members 92 are connected by screws 94 to the two halves 30a, 30b.

When the two halves 30a, 30b of the main body 30 are assembled, this creates at least one internal hollow chamber 100 having an open bottom, as shown in FIG. 7. FIG. 7 is an enlarged isometric view showing the bottom of one of the chambers 100 of the service cabinet 10. In the illustrated service cabinet 10, two chambers 100 are provided and both are separated from the other by the vertically-extending flanges 56, as well as the utility pole 12, when the service cabinet 10 is assembled thereon. Each chamber 100 can be access by two of the access doors 70. The chamber 100 formed inside the service cabinet 10 can be used to receive, for instance, connectors for the auxiliary ground wires 22, 24 (FIG. 1), wiring connections, the electronic equipments associated with low voltage power distribution (for instance below 600 Volts), communication networks, etc.

FIG. 7 also shows a ground wire 102 that is provided for electrically connecting the two halves 30a, 30b of the main body 30 to the ground wire of the utility pole 12. The frame 40 being preferably made of one or more electrical conductive materials, the ground wire 102 is simply connected to terminals 104, 105 in each half 30a, 30b of the main body 30.

In the illustrated example, the bottom section of the utility pole 12 is attached to a mounting plate 106 having holes 108 into which bolts (not shown) can be inserted to attach the utility pole 12 to the base 14 (FIG. 1). Concrete bases often have partly-embedded anchor bolts extending vertically above the upper surface of the base for engagement in the corresponding holes 108 provided in the mounting plate 106. Nuts (not shown) are then threaded to the anchor bolts for securing the utility pole 12 to its base 14. The arrangement of nuts and bolts can also be inverted, depending on the design.

An arrangement for adjusting a height of the service cabinet 10 with reference to the base 14 can be provided. This may comprises, as shown, a plurality of spaced-apart height-adjustment bolts 110 cooperating with threaded holes provided in the brackets 58. Each height-adjustment bolt 110 has a bottom tip engaging an upper surface of the base 14 or of the mounting plate 106 of the utility pole 12. A total of four height adjustment bolts 110 are provided in the example. Each bolt 110 can be independently operated to level the main body 30 before final tightening of the service cabinet 10 to the utility pole 12. Radially-disposed bolts 112 are provided in corresponding threaded holes in the annular members 42, 44 for engaging the surface of the utility pole 12. The tip of the bolts 112 can also engage the surface through a protective sleeve 114, as shown, to prevent the surface of the utility pole 12 from being damaged. The sleeve 114 can also be useful when the surface of the utility pole 12 is textured for a tighter fit and/or to reduce vibrations. FIG. 7 shows such textured surface. Other ways of adjusting the height of the service cabinet 10 can be devised as well.

Figure 8:
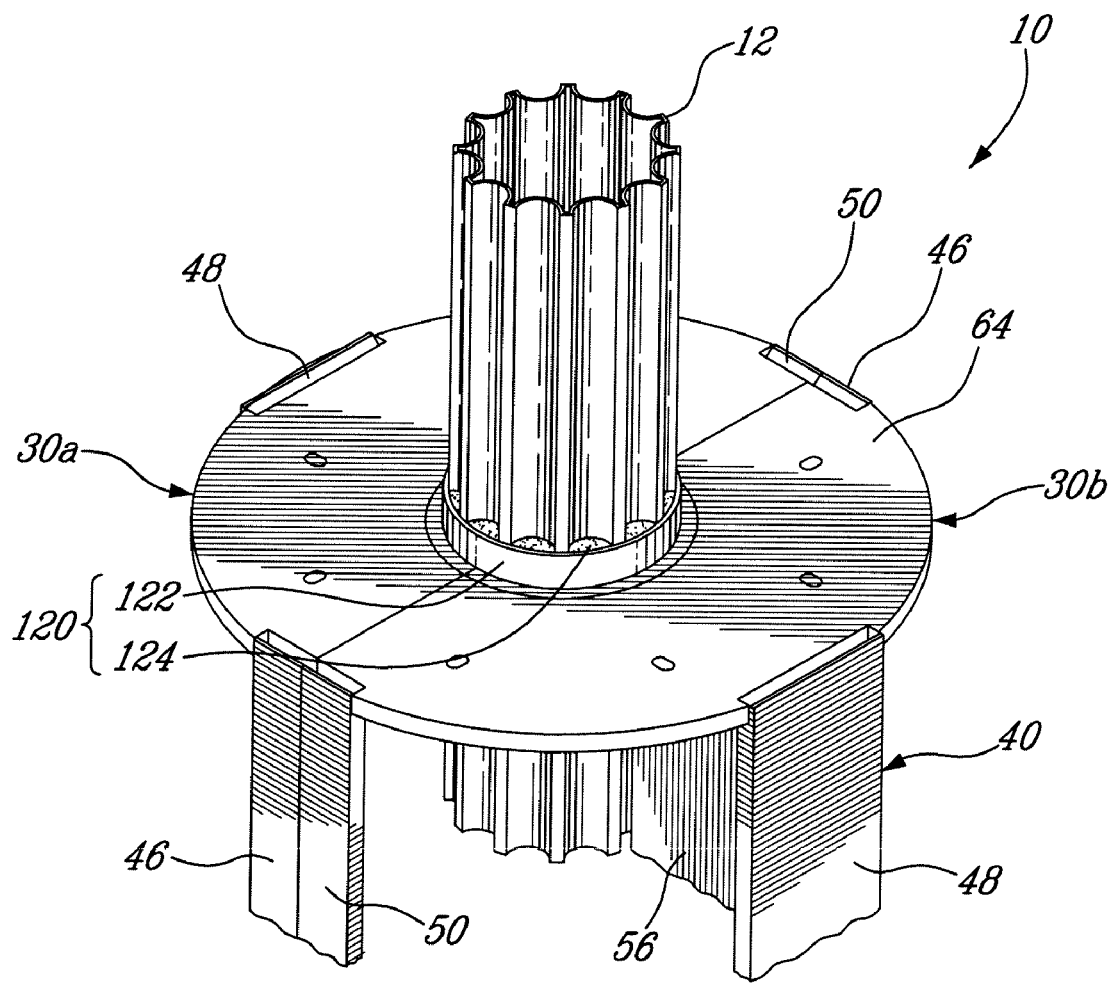
FIG. 8 is an enlarged isometric view showing the upper side of the assembled main body of the service cabinet shown in FIG. 1.

FIG. 8 is an enlarged isometric view showing the top wall 64 of the service cabinet 10 and a portion of the utility pole 12 having a textured surface. The junction between the surface of the utility pole 12 and the inner edge of the assembled service cabinet 10 includes a seal 120. The seal 120 is used for preventing water from entering the internal chambers 100 of the service cabinet 10. The illustrated seal 120 comprises a sleeve portion 122 made of a resilient material and also a malleable portion 124, which portion 124 is used for closely matching the texture of the surface of the utility pole 12. The malleable portion 124 can be for instance a wax seal similar to the one used in pluming for sealing a toilet to a waste water pipe. The sleeve portion 122 can be useful for reducing vibrations. Other seal arrangements can be used as well. The seal 120 is optional. For instance, the service cabinet 10 can be used indoors or be used in an area protected from rain.

Figure 9:
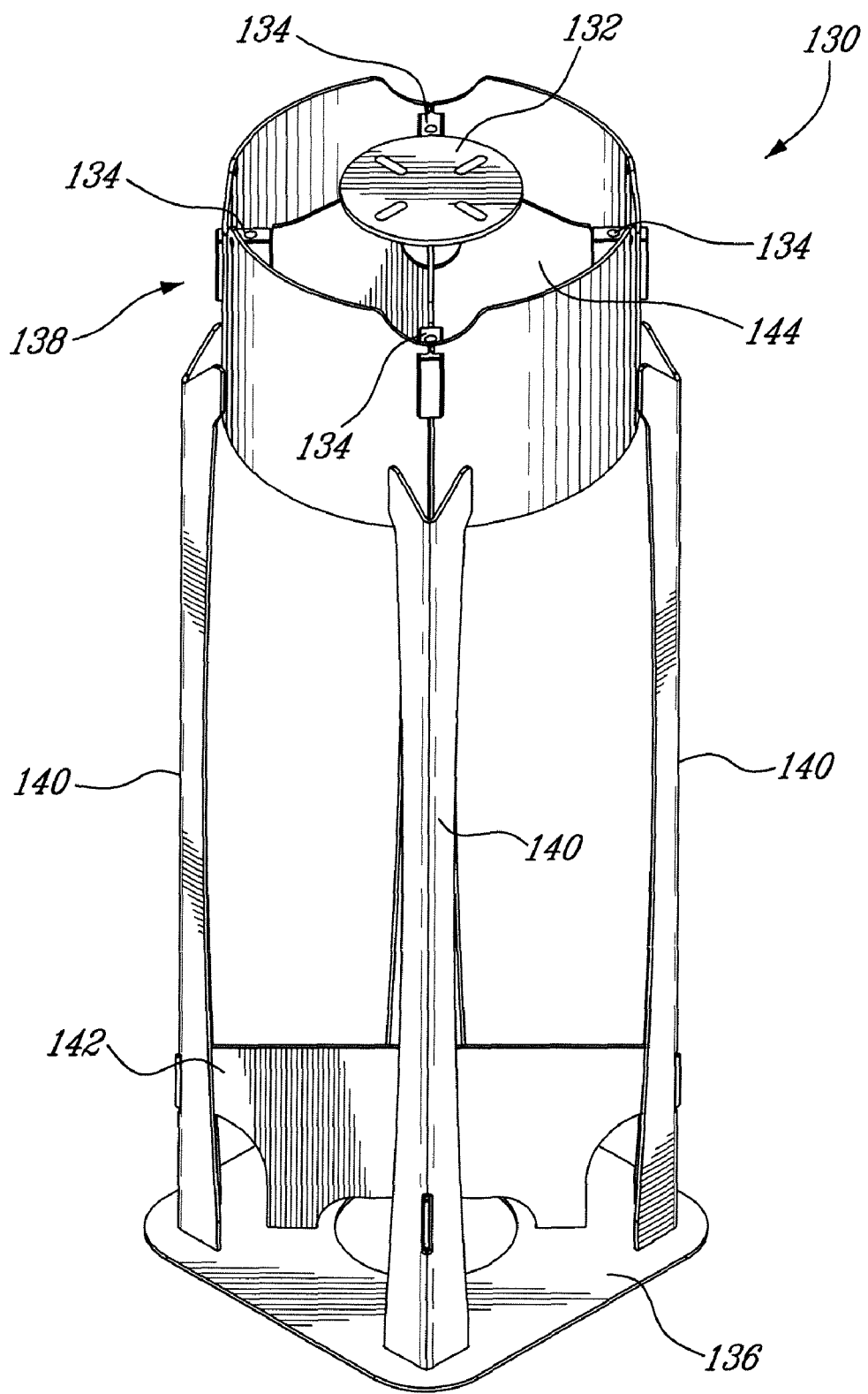
FIG. 9 is an isometric view of an example of a metallic base over which the utility pole and the service cabinet can be mounted.

FIG. 9 illustrates an example of a metallic base 130 designed to replace a concrete base and which can be useful for some application. The illustrated metallic base 130 provides more space for ground wires compared to a concrete base and also protects the upper end of the wires. The base 130 holds the utility pole 12 on an upper plate 132, which upper plate 132 is designed to cooperate with the mounting plate 106 of the utility pole 12. The illustrated metallic base 130 is further provided with anchoring points 134 for the bottom L-shaped brackets 60 of the illustrated service cabinet 10. Bolts can then be used for securing the brackets 60 of the service cabinet 10 directly to the metallic base 130. The illustrated metallic base 130 includes a bottom plate 136 connected to a circular upper end 138 by a plurality of wedge-shaped legs 140. The base 130 is reinforced by flanges 142, 144.

As can be appreciated, since the service cabinet 10 is provided at the bottom of the utility pole 12, the presence of the service cabinet 10 will only have a very minimal impact since it is very suitably integrated with the existing street furniture. The fact that it is connected to the utility pole 12 also enhances the solidity of the service cabinet 10. The service cabinet 10 can have, for instance, a diameter of about 450 mm. Other dimensions are possible as well. Overall, the service cabinet 10 of the improved concept has many advantages in terms of flexibility and versatility while minimizing costs. It can be use around existing utility poles as a retrofit cabinet, or be used around newly installed utility poles.

The concept presented in the present description and also claimed in the appended set of claims is not limited to the example shown and described. The shape of the service cabinet can be different from what is shown in the figures. For instance, the side wall of the service cabinet is not necessarily circular and other shapes can be used. The utility pole can also be offset with reference to the center of the service cabinet. Furthermore, the service cabinet may be used without equipment or connections therein, i.e. being empty. Service cabinets can be installed in an area simply for matching the visual aspect of other service cabinets in which equipment and/or connections are provided. They may otherwise be provided empty for future use. Service cabinets, or a part thereof, can be used for storing items that are unrelated to communication networks or power distribution. For instance, service cabinets could be use for storing mail bags or spare parts for a nearby equipment. Another possibility is to use the service cabinet for non-electrical connections, for instance natural gas connections, valves and/or counters. If desired, the main body of the service cabinet can be made of more than two parts connectable together around the utility pole. The various parts (or halves) of the main body can be identical or not. Access doors can be much smaller than those that are illustrated in the appended figures or span the various parts (or halves) of the main body. If desired, some of the internal chambers can be sealed off and not being accessible while a separate chamber in the same service cabinet can be accessed. The top wall is not necessarily horizontal. It can be inclined, rounded or have other shapes. The illustrated metallic base can be modified.

Still, other modifications and variants, which fall within the scope of the appended claims, can be devised as well.

What is claimed is:

1. A retrofit service cabinet for an existing utility pole extending upwardly from the ground, the service cabinet having at least two body sections to be removably coupled together for providing at least two internal chambers, the service cabinet comprising:

an interior frame comprising an inner frame portion and an outer frame portion, wherein the outer frame portion comprises a plurality of vertically-extending and spaced-apart outer frame members, the outer frame portion being connected to the inner frame portion by a plurality of flanges;

an external shell connected to the outer frame portion, the external shell having at least one access door for each of the internal chambers; and means for removably connecting the interior frame around the utility pole.

2. The service cabinet as defined in claim 1, wherein the inner frame portion comprises a plurality of spaced-apart annular members surrounding the utility pole.

3. The service cabinet as defined in claim 1, wherein at least some of the outer frame members include bottom-projecting legs.

4. The service cabinet as defined in claim 1, wherein each internal chamber includes two opposite access doors among the access doors, each access door having a first edge pivotally connected to a corresponding one of the outer frame members and being pivotable around a vertical axis, each access door having a second edge, opposite its first edge, that is engaged in a closed position against another one of the outer frame members.

5. The service cabinet as defined in claim 4, wherein the outer frame members receive the second edge of each access door on an outer surface seal.

6. The service cabinet as defined in claim 4, wherein each access door cooperates with a corresponding lock that can be activated when the access door is in the closed position so as to prevent unauthorized persons from accessing the at least one internal chamber.

7. The service cabinet as defined in claim 1, wherein the internal chambers are separated from each other by some of the flanges and the utility pole.

8. The service cabinet as defined in claim 1, wherein the means for removably connecting the frame to the utility pole comprise a plurality of spaced-apart bolts cooperating with the inner frame portion, each bolt having a tip engaging the surface of the utility pole.

9. The service cabinet as defined in claim 1, further comprising means for leveling the cabinet with reference to a base to which the utility pole is connected.

10. The service cabinet as defined in claim 9, wherein the means for leveling comprise a plurality of space-apart height-adjustment bolts cooperating with bottom elements of the frame, each height-adjustment bolt having a tip engaging an upper surface of the base.

11. The service cabinet as defined in claim 1, further comprising vibration dampers between the inner frame portion and the utility pole.

12. The service cabinet as defined in claim 1, wherein the external shell has a bottom opening communicating with each internal chamber.

13. The service cabinet as defined in claim 1, wherein the external shell is larger than a base to which the utility pole is connected, the external shell being larger on all sides with reference to the utility pole.

14. The service cabinet as defined in claim 1, wherein the external shell comprises a top wall having an inner opening in sealing engagement with a surface of the utility pole.

15. A retrofit service cabinet for an existing utility pole extending upwardly from the ground, the service cabinet having at least two body sections to be removabley coupled together for providing at least two internal chambers, the service cabinet comprising:
   an interior frame comprising an inner frame portion and an outer frame portion;
   an external shell connected to the outer frame portion, the external shell having at least one access door for each of the internal chambers;
   means for removably connecting the interior frame around the utility pole; and
   wherein the means for removably connecting the frame to the utility pole comprise a plurality of spaced-apart bolts cooperating with the inner frame portion, each bolt having a tip engaging the surface of the utility pole.

16. A retrofit service cabinet for an existing utility pole extending upwardly from the ground, the service cabinet having at least two body sections to be removabley coupled together for providing at least two internal chambers, the service cabinet comprising:
   an interior frame comprising an inner frame portion and an outer frame portion;
   an external shell connected to the outer frame portion, the external shell having at least one access door for each of the internal chambers;
   means for removably connecting the interior frame around the utility pole; and
   further comprising means for leveling the cabinet with reference to a base to which the utility pole is connected.

17. A retrofit service cabinet for an existing utility pole extending upwardly from the ground, the service cabinet having at least two body sections to be removabley coupled together for providing at least two internal chambers, the service cabinet comprising:
   an interior frame comprising an inner frame portion and an outer frame portion;
   an external shell connected to the outer frame portion, the external shell having at least one access door for each of the internal chambers;
   means for removably connecting the interior frame around the utility pole; and
   further comprising vibration dampers between the inner frame portion and the utility pole.

* * * * *